US012444875B1

(12) United States Patent
Winch et al.

(10) Patent No.: US 12,444,875 B1
(45) Date of Patent: Oct. 14, 2025

(54) AC POWER TRANSFER MODULES

(71) Applicant: HAPPY LITTLE PIGS, LLC, Powell, OH (US)

(72) Inventors: Christopher A. Winch, Powell, OH (US); Rockne E. Grimes, Jr., West Liberty, OH (US)

(73) Assignee: HAPPY LITTLE PIGS, LLC, Powell, OH (US)

( * ) Notice: Subject to any disclaimer, the term of this patent is extended or adjusted under 35 U.S.C. 154(b) by 0 days.

(21) Appl. No.: 19/057,793

(22) Filed: Feb. 19, 2025

(51) Int. Cl.

| | |
|---|---|
| ***H01R 13/502*** | (2006.01) |
| ***H01H 3/46*** | (2006.01) |
| ***H01H 9/02*** | (2006.01) |
| ***H01H 9/16*** | (2006.01) |
| ***H01R 11/01*** | (2006.01) |
| ***H01R 13/717*** | (2006.01) |
| ***H01R 24/70*** | (2011.01) |
| ***H01R 24/78*** | (2011.01) |
| ***H01R 103/00*** | (2006.01) |

(52) U.S. Cl.
CPC ............. *H01R 13/502* (2013.01); *H01H 3/46* (2013.01); *H01H 9/0271* (2013.01); *H01H 9/161* (2013.01); *H01R 11/01* (2013.01); *H01R 13/7175* (2013.01); *H01R 24/70* (2013.01); *H01R 24/78* (2013.01); *H01R 2103/00* (2013.01)

(58) Field of Classification Search
CPC .. H01R 13/502; H01R 13/7175; H01R 13/71; H01R 13/70; H01R 13/703; H01R 11/01; H01R 24/70; H01R 24/78; H01R 2103/00; H01H 3/46; H01H 9/0271; H01H 9/161
USPC .................................................. 439/106, 188
See application file for complete search history.

(56) References Cited

U.S. PATENT DOCUMENTS

| | | | | |
|---|---|---|---|---|
| 7,229,301 | B2 * | 6/2007 | Britz | H02K 5/225 439/218 |
| 11,990,718 | B1 * | 5/2024 | King | H01R 13/665 |
| 2007/0149013 | A1 * | 6/2007 | Eastham | H02J 13/0005 439/140 |
| 2011/0153880 | A1 * | 6/2011 | McCoy | B60L 53/305 710/33 |
| 2020/0218214 | A1 * | 7/2020 | Coon | H01R 31/065 |
| 2023/0143416 | A1 * | 5/2023 | Chin | H01R 27/00 439/626 |

* cited by examiner

*Primary Examiner* — Gary F Paumen
(74) *Attorney, Agent, or Firm* — McNees Wallace & Nurick LLC

(57) ABSTRACT

An AC power transfer module includes at least one adapter and at least one grabber, the AC power transfer module operable to enable uninterrupted delivery of power to a demand unit. The adapter is configured to plug into an original power source and supply electricity to the demand unit which is plugged into the adapter, and the grabber is configured to plug into the adapter and separately engage with a transfer power source. The adapter includes a mechanical switch that is actuated by engagement of the adapter with the grabber to switch the supply of power from the original power source to the transfer power source, whereby the AC power transfer module enables switching to a new power supply without power disruption to the demand unit.

20 Claims, 11 Drawing Sheets

AC POWER TRANSFER MODULES

FIELD OF DISCLOSURE

The present disclosure relates to AC power transfer modules.

BACKGROUND

In business operations, power disruptions can lead to loss of critical information, corruption of electronic records, and failure of critical systems, which will jeopardize the productivity, continuity, and sustainability of businesses. Currently, switching to a new power supply or power source can be performed with interruption of business operations. This interruption may impact hours of business operations, delaying the provision of services, which will lead to significant financial loss to businesses.

Therefore, there is a need for a seamless power switch to a new power supply ensuring uninterrupted functionality of business operations that is easy to use, affordable, and effective.

SUMMARY

The present disclosure describes various exemplary embodiments of an AC power transfer module comprising at least one adapter and at least one grabber. The adapter and grabber operate to enable uninterrupted supply of power to a demand unit, for example, a computer, during transfer of the demand unit from an original power source to a transfer power source. Generally, a power source may be one of a multi-outlet power supply, a single outlet power supply, a battery backup enabled power supply, a wall outlet, or other power source. The adapter is configured to plug into the original power source, and supply electricity to the demand unit which is plugged into the adapter. The grabber is configured to plug into the adapter and separately engage with a transfer power source via a power cord (for example, an dedicated or standard extension cord) that is plugged into the transfer power source. In use, as the grabber is inserted into the adapter, a mechanical switch inside the adapter is actuated to switch the supply of power from the original power source to the transfer power source, whereby the AC power transfer module enables switching to a new power supply without power disruption to the demand unit. The adapter includes prongs configured to connect to the original power source. The adapter prongs may be two prongs, including hot and neutral pins, or may be three prongs, including hot and neutral pins and a ground wire. The adapter may be adapted to connect by plugged engagement to common or commercially available power sources. Likewise, the adapter may be adapted to receive by plugged engagement common or commercially available power cords from demand units. The grabber is configured to connect to a transfer power source via plugged engagement with a common or commercially available extension or power cord that is connectable via plugged engagement with the transfer power source. The adapter is configured to receive the grabber via a mating engagement of a diverter on the grabber within an adapter slot in the adapter. As the grabber is inserted into the adapter, the grabber triggers mechanical translation of a toggle which terminates connection with the original power source and establishes powered connection to the transfer power source, whereby the supply of power is switched from the original power source to the transfer power source without power disruption to the demand unit plugged into the adapter. The AC power transfer module solves the problem of loss of power to a demand unit during transfer between two power supplies which may be necessitated in the event of a threat of power loss to the original power source, the need to move the demand unit to another location, or other reason.

In an embodiment, the disclosure provides an AC power transfer module that includes at least one adapter and at least one grabber, the AC power transfer module operable to enable uninterrupted delivery of power to a demand unit. The adapter is configured to plug into an original power source and supply electricity to the demand unit which is plugged into the adapter, and the grabber is configured to plug into the adapter and separately engage with a transfer power source. The adapter includes a mechanical switch that is actuated by engagement of the adapter with the grabber to switch the supply of power from the original power source to the transfer power source, whereby the AC power transfer module enables switching to a new power supply without power disruption to the demand unit In an embodiment, an AC power transfer module is configured to enable switching to a transfer power source from an original power source without power disruption. The module includes an adapter and a grabber. The adapter includes: an adapter housing; adapter prongs extending from the adapter housing and including adapter pins configured to receive power from an original power source; an adapter receptacle disposed on the adapter housing and configured to receive a demand cord extending from a demand unit; an adapter slot disposed on a side of the adapter housing; and a switch, in some particular embodiments a mechanical switch, and in some embodiments, a toggle. In some embodiments the mechanical switch is disposed inside the adapter housing. The demand cord includes a demand cord housing and demand cord prongs extending from the demand cord housing. The demand cord prongs include demand cord pins. The toggle includes toggle pins having an end, connector pins, and a toggle bumper, the toggle bumper disposed on the end of the toggle pins. The connector pins are configured to make contact with the demand cord pins when the demand cord pins are inserted in the adapter receptacle, and the toggle pins are configured to rotate about a toggle rotation axis by an angle from about 1° to about 90°. The grabber includes: a grabber housing having ends; a diverter extending from and disposed on one end of the grabber housing; and a grabber receptacle formed and disposed on the opposing end of the grabber housing. The diverter includes conductors disposed thereon. The grabber receptacle is configured to receive an extension cord receptacle of an extension cord from a transfer power source. The grabber receptacle includes grabber receptacle pins configured to be inserted into extension cord receptacle slots disposed within the extension cord receptacle.

The diverter is configured to be inserted through the adapter slot whereby pushing the toggle bumper and moving the toggle pins from a first position to a second position by causing the toggle pins to rotate about the toggle rotation axis by a predetermined angle.

The toggle pins in the first position make contact with the adapter pins and the connector pins whereby providing electricity from the original power source to the demand unit when the adapter pins are inserted in a receptacle of the original power source, and the demand cord prongs are inserted in the adapter receptacle, and the toggle pins in the second position make no contact with the adapter pins and the connector pins, and the conductors make contact with the connector pins whereby providing electricity from the transfer power source to the demand unit when the extension cord receptacle is inserted in the grabber receptacle.

In some embodiments, the predetermined angle ranges from about 1° to about 90°.

In some embodiments, the predetermined angle ranges from about 5° to about 85°.

In some embodiments, the predetermined angle ranges from about 300 to about 60°.

In some embodiments, the predetermined angle is about 45°.

In some embodiments, the demand cord prongs include a demand cord ground wire, and the adapter prongs include an adapter ground wire configured to connect with a demand cord ground wire.

In some embodiments, the demand cord prongs include a demand cord ground wire, the grabber receptacle includes a grabber receptacle ground wire, and the diverter includes a grounding conductor extending from the grabber receptacle ground wire. The grounding conductor is configured to connect with the demand cord ground wire, and the grabber receptacle ground wire is configured to be inserted into the extension cord receptacle slots.

In some embodiments, the grabber includes a grabber safety cover, the grabber safety cover configured to cover the diverter and limit the exposure of the diverter. The grabber safety cover includes grabber relief slots, and the grabber relief slots are configured such that as the diverter is inserted in the adapter, the grabber relief slots pass the demand cord pins while keeping the demand cord pins in the grabber relief slots.

In some embodiments, the adapter includes a power light configured to turn on and off, and the power light when turned on indicates that electricity operating the power light is coming from the original power source.

In some embodiments, the power light is a red LED light.

In some embodiments, the adapter includes an aux power light configured to turn on and off, and the aux power light when turned on indicates that electricity operating the aux power light is coming from the transfer power source.

In some embodiments, the aux power light is a green LED light.

In an exemplary embodiment, the adapter includes: a plurality of adapter receptacles disposed on the adapter housing, a plurality of toggles corresponding to the plurality of the adapter receptacles; and an adapter slot configured to receive a diverter of the grabber. Each adapter receptacle is configured to receive one demand cord from a demand unit. Each demand cord includes demand cord prongs. Each demand cord prongs are in contact with the connector pins of the corresponding toggle when the demand cord prongs are inserted in the corresponding adapter receptacle. The toggle pins in the first position are in contact with the connector pins connected to a demand unit and the adapter pins connected to the original power source. Each demand unit forms a circuit with the original power source, and the original power source supplies electricity to each demand unit. As the diverter advances, the connector pins of the toggles make contact with the conductors prior to the toggle pins losing their contacts with the connector pins, thereby providing a seamless transition of power from the original power source to the transfer power source for each demand unit when the diverter is inserted into the adapter slot making the toggle pins in the second position and the extension cord receptacle connected to the transfer power source is inserted in the grabber receptacle.

In another exemplary embodiment, an AC power transfer is configured to enable switching to a transfer power source from an original power source without power disruption. The module includes an adapter and a grabber. The adapter includes: an adapter housing; adapter prongs extending from the adapter housing and including adapter pins configured to receive power from an original power source and an adapter ground wire; an adapter receptacle disposed on the adapter housing and configured to receive a demand cord extending from a demand unit; an adapter slot disposed on a side of the adapter housing; and a toggle disposed inside the adapter housing. The demand cord includes a demand cord housing and demand cord prongs extending from the demand cord housing. The demand cord prongs include demand cord pins and a demand cord ground wire. The toggle includes toggle pins having an end, connector pins, and a toggle bumper, the toggle bumper disposed on the end of the toggle pins. The connector pins are configured to make contact with the demand cord pins when the demand cord pins are inserted in the adapter receptacle, and the toggle pins are configured to rotate about a toggle rotation axis by an angle. The grabber includes: a grabber housing having ends; a diverter extending from and disposed on one end of the grabber housing; and a grabber receptacle formed and disposed on the opposing end of the grabber housing. The diverter includes conductors disposed thereon and a grounding conductor configured to connect with the demand cord ground wire. The grabber receptacle is configured to receive an extension cord receptacle of an extension cord from a transfer power source. The grabber receptacle includes grabber receptacle pins configured to be inserted into extension cord receptacle slots disposed within the extension cord receptacle and a grabber receptacle ground wire extending from the grounding conductor and configured to be inserted into the extension cord receptacle slots.

The diverter is configured to be inserted through the adapter slot whereby pushing the toggle bumper and moving the toggle pins from a first position to a second position by causing the toggle pins to rotate about the toggle rotation axis by a predetermined angle.

The toggle pins in the first position make contact with the adapter pins and the connector pins whereby providing electricity from the original power source to the demand unit when the adapter pins are inserted in a receptacle of the original power source, and the demand cord prongs are inserted in the adapter receptacle. The toggle pins in the second position make no contact with the adapter pins and the connector pins, and the conductors make contact with the connector pins whereby providing electricity from the transfer power source to the demand unit when the extension cord receptacle is inserted in the grabber receptacle.

In some embodiments, the predetermined angle ranges from about 5° to about 85°.

In some embodiments, the predetermined angle ranges from about 30° to about 60°.

In some embodiments, the predetermined angle is about 45°.

In some embodiments, the adapter includes a power light configured to turn on and off, and the power light when turned on indicates that electricity operating the power light is coming from the original power source.

In some embodiments, the power light is a red LED light.

In some embodiments, the adapter includes an aux power light configured to turn on and off, and the aux power light when turned on indicates that electricity operating the aux power light is coming from the transfer power source.

In some embodiments, the aux power light is a green LED light.

Yet, in another exemplary embodiment, an AC power transfer module is configured to enable switching to a transfer power source from an original power source without power disruption. The module includes an adapter and a grabber. The adapter includes: an adapter housing; adapter prongs extending from the adapter housing and including adapter pins configured to receive power from an original power source and an adapter ground wire; an adapter receptacle disposed on the adapter housing and configured to receive a demand cord extending from a demand unit; an adapter slot disposed on a side of the adapter housing; and a toggle disposed inside the adapter housing. The demand cord includes a demand cord housing and demand cord prongs extending from the demand cord housing. The demand cord prongs include demand cord pins and a demand cord ground wire. The toggle includes toggle pins having an end, connector pins, and a toggle bumper, the toggle bumper disposed on the end of the toggle pins. The connector pins are configured to make contact with the demand cord pins when the demand cord pins are inserted in the adapter receptacle, and the toggle pins are configured to rotate about a toggle rotation axis by an angle. The grabber includes: a grabber housing having ends; a diverter extending from and disposed on one end of the grabber housing; and a grabber receptacle formed and disposed on the opposing end of the grabber housing. The diverter includes conductors disposed thereon and a grounding conductor configured to connect with the demand cord ground wire. The grabber receptacle is configured to receive an extension cord receptacle of an extension cord from a transfer power source. The grabber receptacle includes grabber receptacle pins configured to be inserted into extension cord receptacle slots disposed within the extension cord receptacle and a grabber receptacle ground wire extending from the grounding conductor and configured to be inserted into the extension cord receptacle slots. The grabber includes a grabber safety cover, the grabber safety cover configured to cover the diverter and limit the exposure of the diverter. The grabber safety cover includes grabber relief slots, and the grabber relief slots are configured such that as the diverter is inserted in the adapter, the grabber relief slots pass the demand cord pins while keeping the demand cord pins in the grabber relief slots.

The diverter is configured to be inserted through the adapter slot whereby pushing the toggle bumper and moving the toggle pins from a first position to a second position by causing the toggle pins to rotate about the toggle rotation axis by a predetermined angle. The predetermined angle is about 45°.

The toggle pins in the first position make contact with the adapter pins and the connector pins whereby providing electricity from the original power source to the demand unit when the adapter pins are inserted in a receptacle of the original power source, and the demand cord prongs are inserted in the adapter receptacle. The toggle pins in the second position make no contact with the adapter pins and the connector pins, and the conductors make contact with the connector pins whereby providing electricity from the transfer power source to the demand unit when the extension cord receptacle is inserted in the grabber receptacle.

The adapter includes a power light configured to turn on and off, the power light when turned on indicates that electricity operating the power light is coming from the original power source, and the power light is a red LED light.

The adapter includes an aux power light configured to turn on and off, the aux power light when turned on indicates that electricity operating the aux power light is coming from the transfer power source, and the aux power light is a green LED light.

Other features and advantages of the present invention will be apparent from the following more detailed description of exemplary embodiments, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

Figure 1:
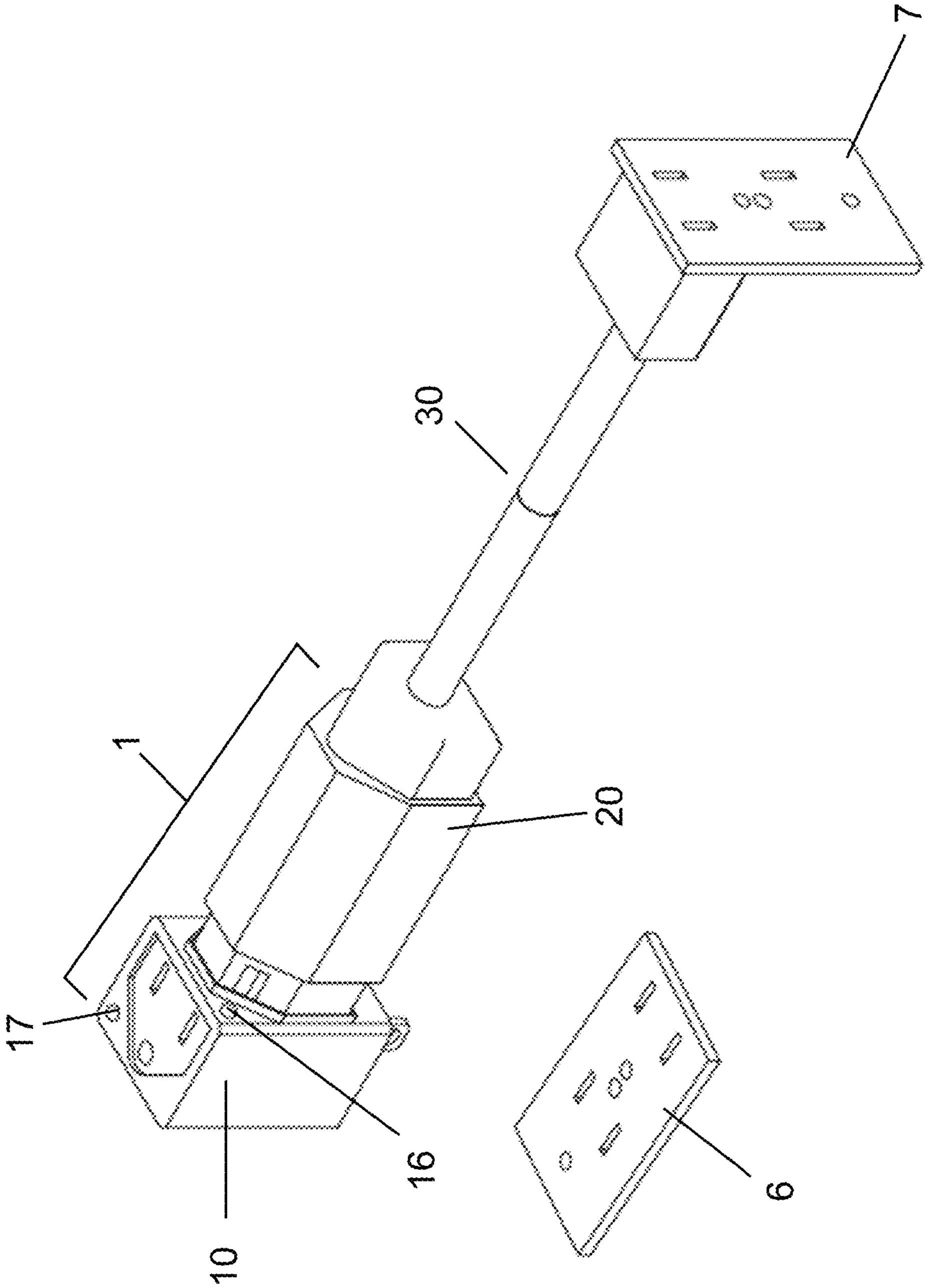
FIG. 1 is a perspective view of an exemplary AC power transfer module according to the invention with an extension cord inserted to the module, and depicting representative examples of power sources.
Figure 2:
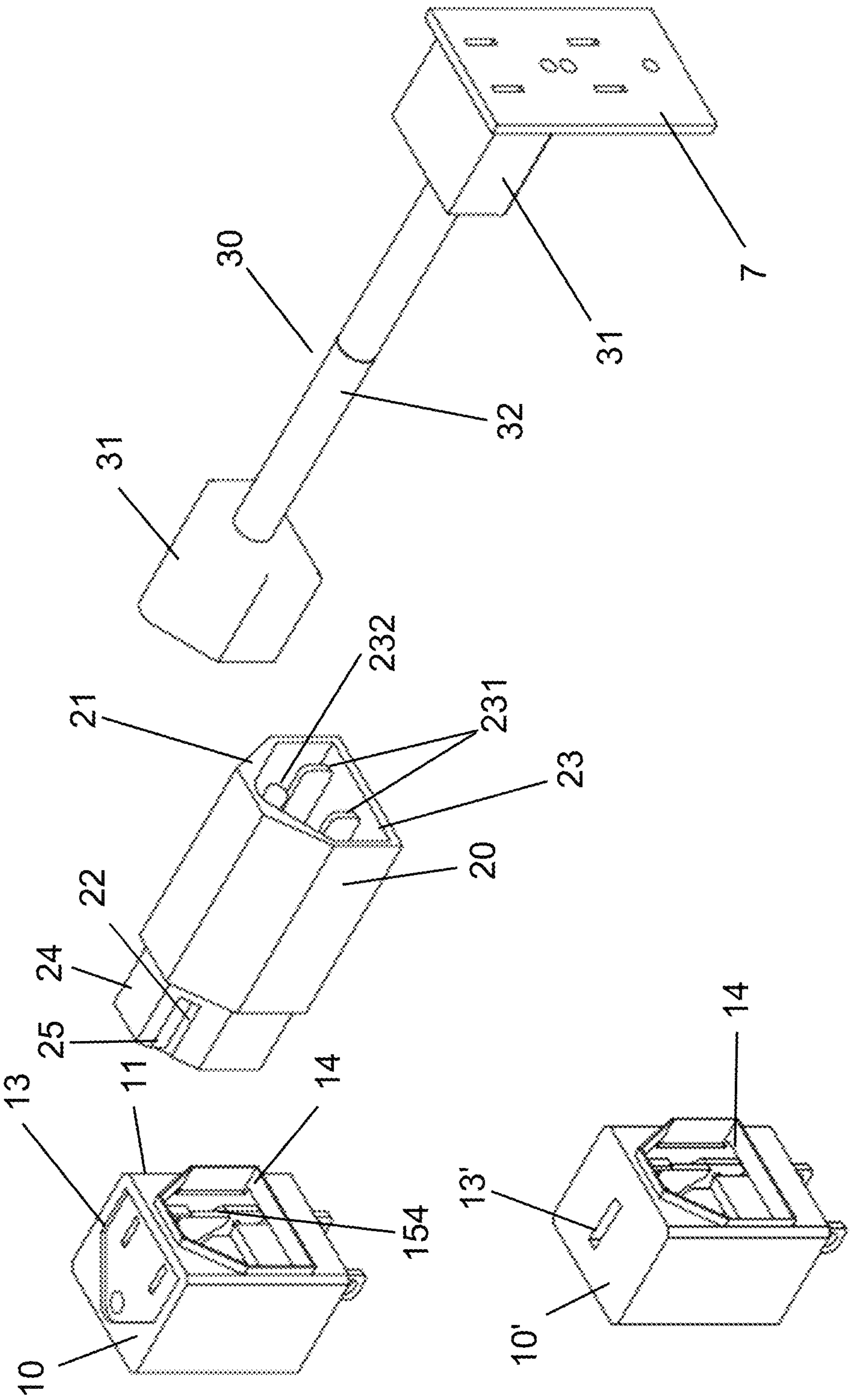
FIG. 2 includes perspective views of the adapter and the grabber of the AC power transfer module and extension cord as shown in FIG. 1, and an alternate embodiment of the adapter for receiving an alternate demand unit plug.
Figure 3:
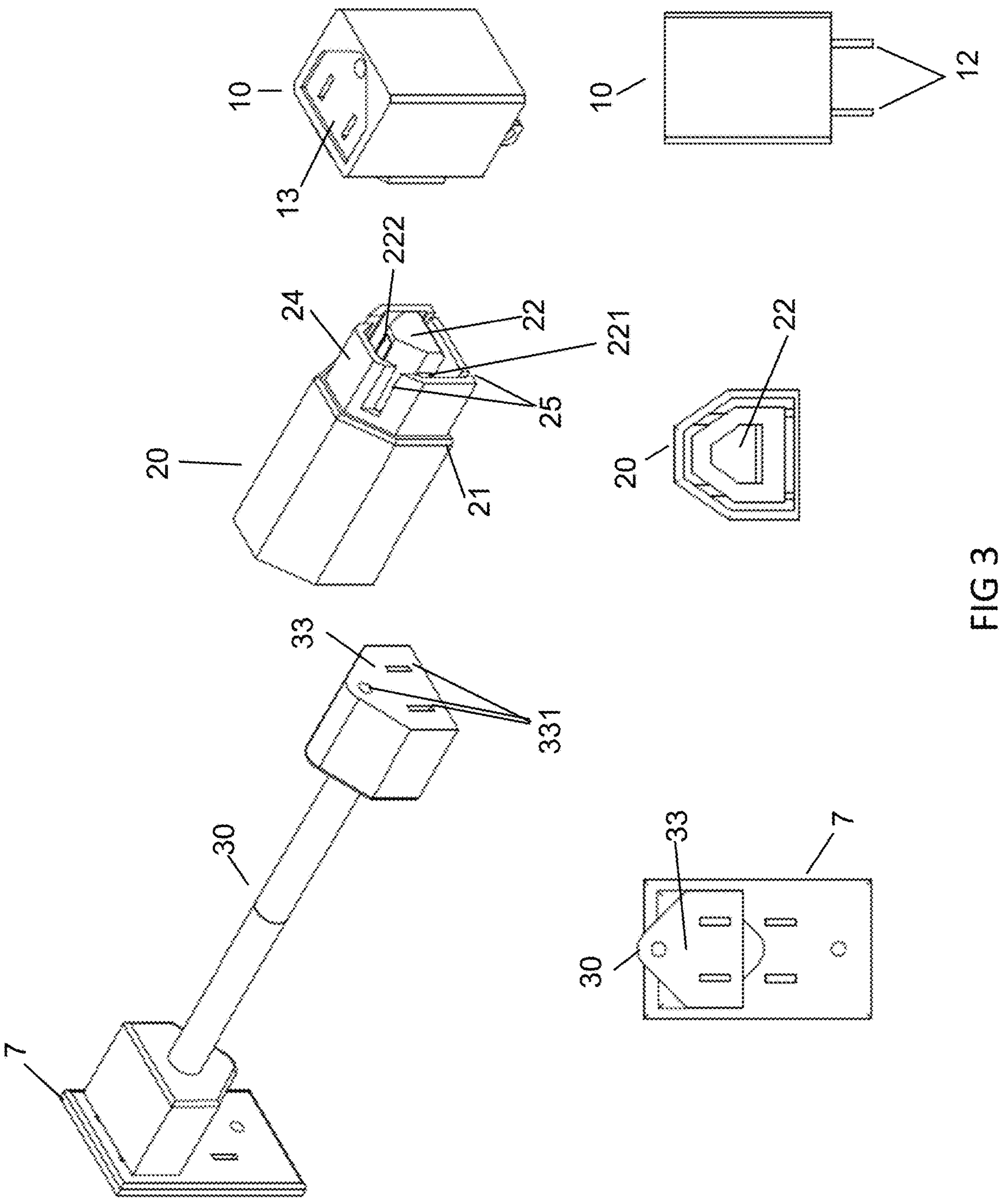
FIG. 3 includes alternate perspective and side views of the adapter and grabber of the AC power transfer module and extension cord shown in FIG. 1.

Following is a listing of representative parts of the AC power transfer module having the reference numerals as shown in the drawings and included in the description.

TABLE OF REFERENCE NUMERALS

| | | | |
|---|---|---|---|
| AC power transfer module | 1 | Grabber Housing | 21 |
| Demand Unit | 5 | Diverter | 22 |
| Original Power Source | 6 | Conductors | 221 |
| Transfer Power Source | 7 | Grounding Conductor | 222 |

-continued

| TABLE OF REFERENCE NUMERALS | | | |
|---|---|---|---|
| Adapter | 10 | Grabber Receptacle | 23 |
| Adapter Housing | 11 | Grabber Receptacle Pins | 231 |
| Adapter Prongs | 12 | Grabber Receptacle Ground Wire | 232 |
| Adapter Pins | 121 | Grabber Safety Cover | 24 |
| Adapter Ground Wire | 122 | Grabber Relief Slots | 25 |
| Adapter Receptacle | 13 | Extension Cord | 30 |
| Adapter Slot | 14 | Extension Cord Housing | 31 |
| Mechanical Switch | 50 | Extension Cord Wire | 32 |
| Toggle | 15 | Extension Cord Receptacle | 33 |
| Toggle Pins | 151 | Extension Cord Receptacle Slots | 331 |
| Toggle Rotation Axis | 152 | Demand Cord | 40 |
| Connector Pins | 154 | Demand Cord Housing | 41 |
| Toggle Bumper | 155 | Demand Cord Prongs | 42 |
| Aux Power Light | 16 | Demand Cord Pins | 421 |
| Power Light | 17 | Demand Cord Ground Wire | 422 |
| Grabber | 20 | Demand Cord Wire | 43 |

DETAILED DESCRIPTION

Figure 4:
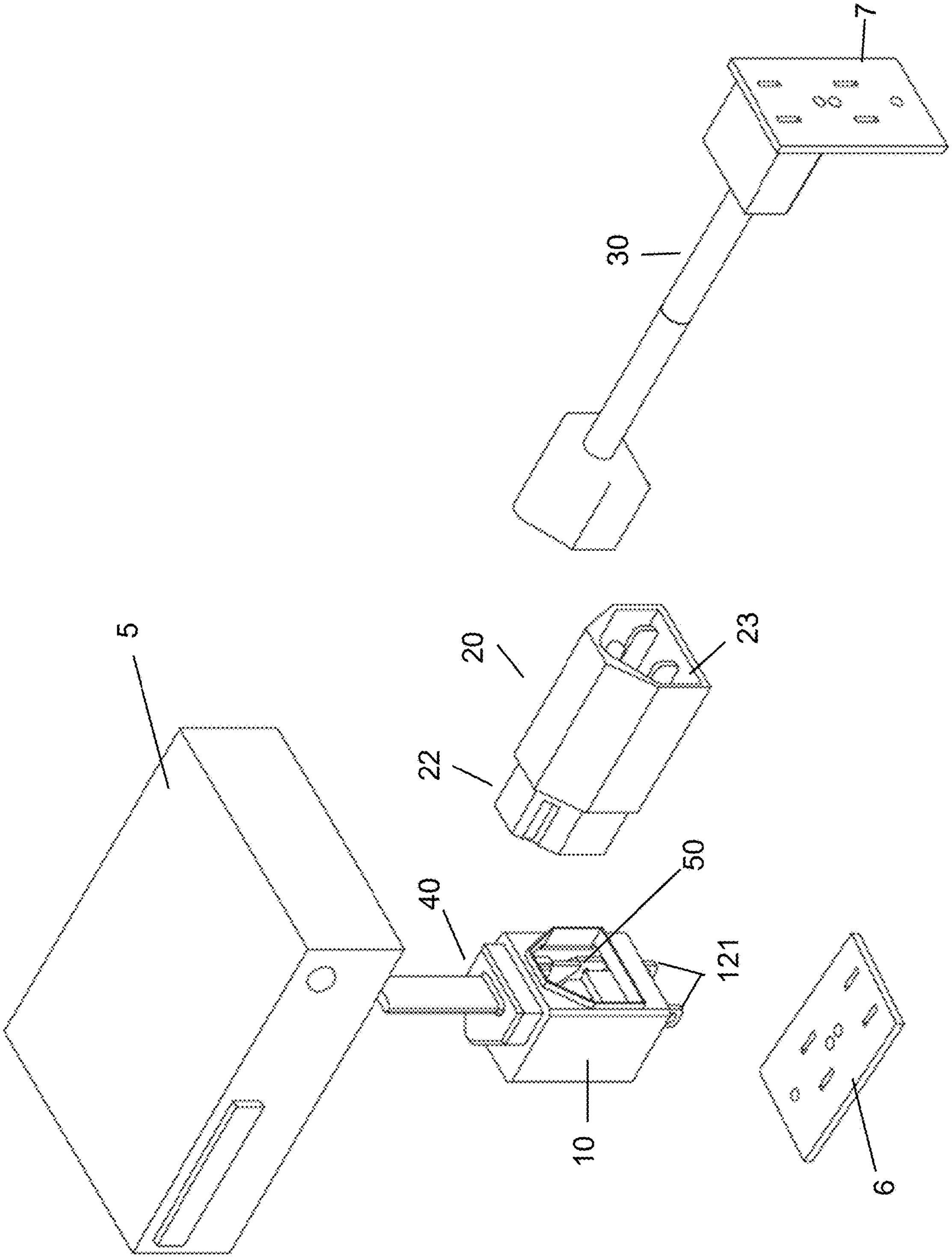
FIG. 4 is an exploded view of the AC power transfer module and extension cord as shown in FIG. 1 with a demand cord to a demand unit plugged into the adapter and extension cord plugged into a transfer power source.

Referring to the drawings, for example, FIG. 4, the AC power transfer module enables uninterrupted supply of power to a demand unit, for example, a computer, during transfer of the demand unit from an original power source to a transfer power source. It will be understood that the demand unit may be any device that is AC powered, for example, a cash register, a server, a monitor, an HVAC device, a health care device, or any other device for which it may be desirable to a user to maintain continuous power while the user is transferring the device from one power source to another. A particularly useful application is the maintenance of power to a critical computer or service and ancillary controlled powered devices during servicing or replacement of a batter back up power supply in which there is a potential for loss of back up in the event of loss of power in the facility due to a failed battery wherein the facility may be a retail store, restaurant, law office, medical office or treatment facility, or the like. Generally, a power source may be one of a multi-outlet power supply, a single outlet power supply, a battery backup enabled power supply, a wall outlet, or other power source. Provided herein is an exemplary AC power transfer module 1, as shown, for example, in FIG. 1 and FIG. 4, the AC power transfer module 1 including an adapter 10 and a grabber 20. Example embodiments of the present disclosure provide for a seamless transition of continuous and uninterrupted flow of power for a demand unit 5 from an original power source 6 to a transfer power source 7. A demand cord 40 from a demand unit 5 may be inserted into the AC power transfer module 1, and an extension cord 30 from a transfer power source 7 may be inserted into the AC power transfer module 1. As used herein, a demand cord 40 and an extension cord 30 may be selected from conventional cords.

The adapter is configured to connect to an original power source, including a battery power source, through, e.g., the insertion of the adapter to a wall outlet, and supply electricity to a demand unit which is connected to the adapter. The grabber is configured to connect to a transfer power source, including a battery power source, through, e.g., the insertion of a power cord from the transfer power source. As the grabber is inserted into the adapter, the power supply is switched to the transfer power source from the original power source, whereby the AC power transfer module enables switching to a new power supply without power disruption. In some embodiments, the mechanical switch, for example a toggle, is configured to be locked or blocked from actuation until the AC power transfer module is confirmed to detect successful flow of power from the transfer power source. Once the AC power transfer module detects power from transfer power source, it will allow actuation of the mechanical switch to allow transfer of power from the original power source to the transfer power source.

The adapter includes prongs configured to connect to the original power source. The adapter prongs may be two prongs, including hot and neutral pins, or may be three prongs, including hot and neutral pins and a ground wire. The adapter may be adapted to connect to common or commercially available power outlets or a dedicated power outlet. Likewise, the adapter may be adapted to receive common or commercially available power cords or a dedicated power cord.

The grabber is configured to connect to a transfer power source, including a battery power source, through, e.g., the insertion of an extension or power cord from the transfer power source. The adapter is configured to receive the grabber. As the grabber is inserted into the adapter, the grabber triggers a mechanical switch, for example, a toggle, and the toggle disconnects the power supply from the original power source and connects power supply from the transfer power source, whereby the power supply is switched to the transfer power source from the original power source without power disruption.

In an exemplary embodiment, an AC power transfer module may include an adapter and a grabber. The adapter may include an adapter housing, adapter prongs, an adapter receptacle, an adapter slot, and a mechanical switch, for example, a toggle. The grabber may include a grabber housing, a diverter, and a grabber receptacle. The adapter prongs may include adapter pins and may further include an adapter ground wire. The adapter pins may be made from tin, tin-lead, gold, silver, or brass. It will be appreciated that any other suitable material may be employed. The adapter ground wire may be made from bare copper wire. However, it will be appreciated that any other suitable material may be employed. The mechanical switch, for example, a toggle may include toggle pins, connector pins, and a toggle bumper on an end of the toggle pins. The toggle pins may be configured to rotate about a toggle rotation axis by an angle from about 1° to about 90° when the diverter of the grabber is inserted into the adapter through the adapter slot. The diverter may include conductors and may further include a grounding conductor. The grabber receptacle may include grabber receptacle pins and grabber receptacle ground wire. In some embodiments, the adapter may further include a power light and an aux power light. In other embodiments, the adapter may include only a single power light. In some embodiments, the grabber may include a grabber safety cover.

Referring now to FIGS. 1-6 and FIGS. 9-11, in one exemplary embodiment, an AC power transfer module 1 is shown. The AC power transfer module 1 includes an adapter 10, a grabber 20. Referring to FIG. 4, the AC power transfer module 1 may also include an extension cord 30 from a transfer power source 7. Referring now to FIG. 5-9, the adapter 10 shown in partial views to depict features interior to the housing includes an adapter housing 11, adapter prongs 12, an adapter receptacle 13, an adapter slot 14, and a mechanical switch 50, for example, a toggle 15. The adapter prongs 12 extend from the adapter housing 11 and include adapter pins 121 and an adapter ground wire 122, thereby forming a three-prong plug. In some implementations, however, the adapter prongs 12 may include only adapter pins 121, which would make the adapter prongs 12 a two-prong plug. The adapter pins 121 correspond to the receptacle of the original power source 6 and are configured to form connection points such that electricity is supplied therethrough when the adapter 10 is plugged in the receptacle of the original power source 6. Referring again to FIG. 2, two embodiments of an adapter 10, 10' are shown wherein the adapter 10' includes an alternate receptacle 13' which may receive input from a demand power cord 40 having a USB or USB-C type connector rather than a standard power cord such as the demand power cord 40 shown, for example, in FIG. 5. It will be appreciated that in all instances of the devices described and depicted herein the plugs, prongs, pins and wires are not limiting and each of the adapter and grabber may be configured to engage with other connectors from demand devices and power sources.

The grabber 20 includes a grabber housing 21, a diverter 22 extending from and disposed on one end of the grabber housing 21, and a grabber receptacle 23 formed and disposed on the opposing end of the grabber housing 21. The grabber receptacle 23 includes grabber receptacle pins 231. The grabber receptacle 23 may further include a grabber receptacle ground wire 232. The grabber receptacle 23 is configured to receive an extension cord 30 from a transfer power source 7. The grabber receptacle 23 may be configured to receive common extension cords or specifically designed extension cords for specific purposes. It will be appreciated that the grabber receptacle 23 may employ any other suitable shapes or dimensions. The extension cord 30 may include an extension cord housing 31 extending from an extension cord wire 32 from the transfer power source 7 and an extension cord receptacle 33 disposed on an end of the extension cord housing 31. The extension cord receptacle 33 includes slots 331 corresponding to the grabber receptacle pins 231 and the grabber receptacle ground wire 232. The diverter 22 may include a grounding conductor 222, and the grounding conductor 222 may extend from the grabber receptacle ground wire 232. The grounding conductor 232 may be configured to connect with a demand cord ground wire 422, and the grabber receptacle ground wire 232 may be configured to be inserted into a slot 331 corresponding to the grabber receptacle ground wire 232. The grabber receptacle 23 is configured to receive the extension cord receptacle 33 of the extension cord 30, and the grabber receptacle pins 231 and ground wire 232 correspond to the slots of the extension cord receptacle 33. When the extension cord 30 is plugged into the grabber receptacle 23, electricity is supplied through the grabber receptacle pins 231 to the grabber 20. The diverter 22 corresponds to the adapter slot 14 of the adapter 10, and the adapter slot 14 is configured to receive the diverter 22.

Figure 5:
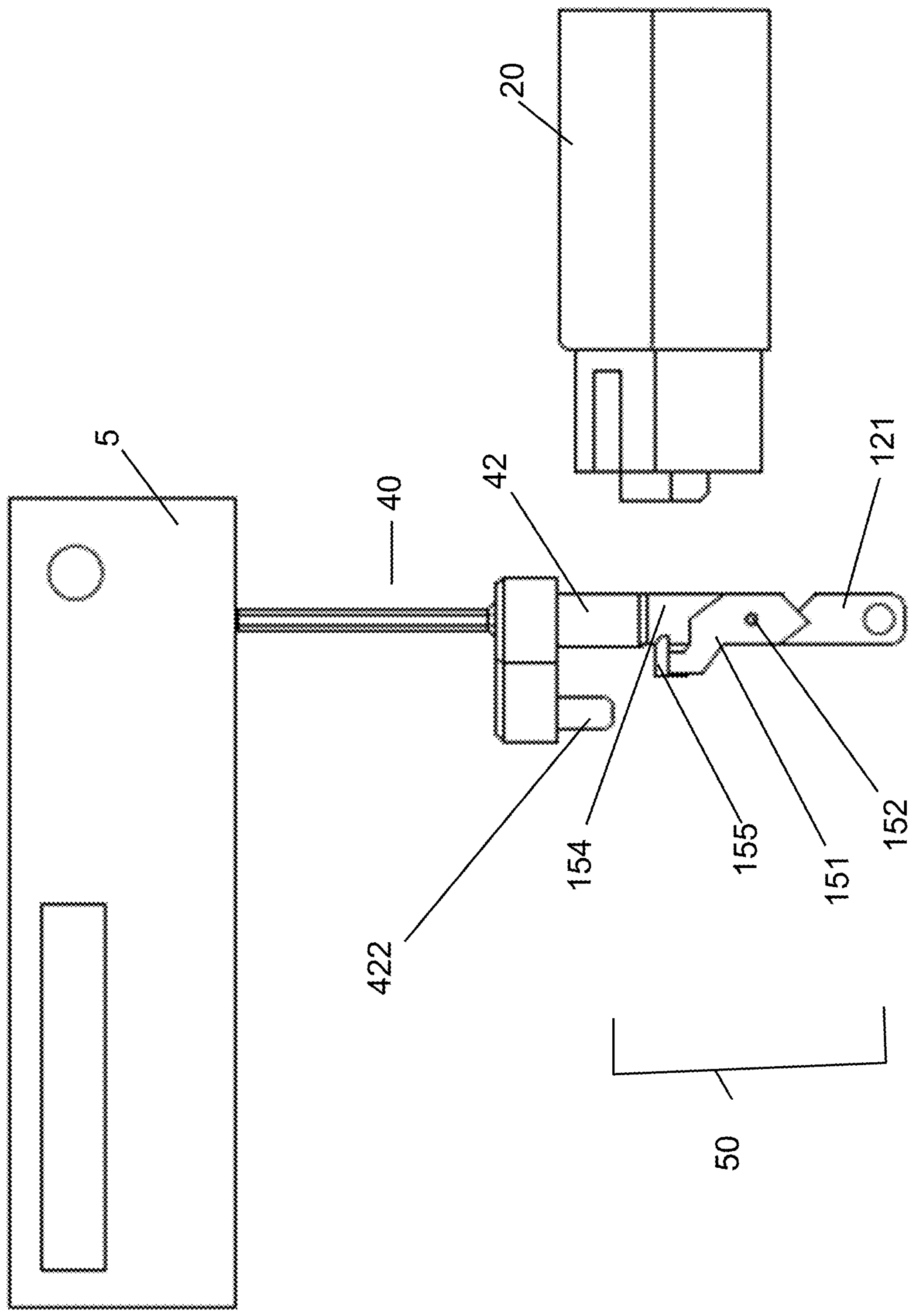
FIG. 5 is a front view of the adapter and grabber components of the AC power transfer module as shown in FIG. 4 with a demand cord to a demand unit plugged into the adapter in which the internal toggle of the adapter is shown aligned with the grabber.
Figure 6:
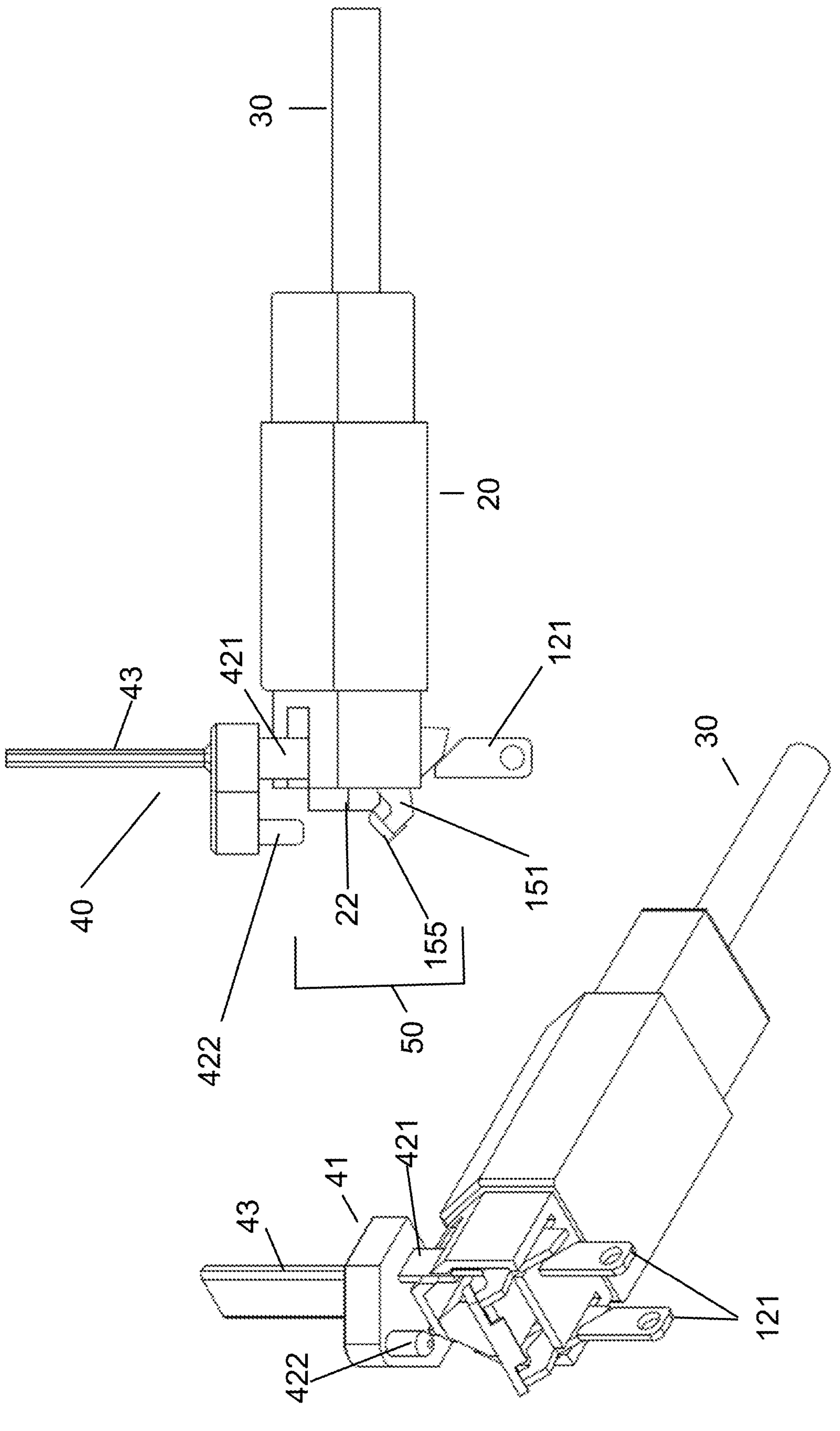
FIG. 6 includes perspective and front views of the adapter and grabber of the AC power transfer module shown in FIG. 5 with an extension cord plugged into the grabber, further showing the grabber inserted into the adapter in which the internal toggle of the adapter is shown engaged with the grabber to displace/rotate the toggle.
Figure 7:
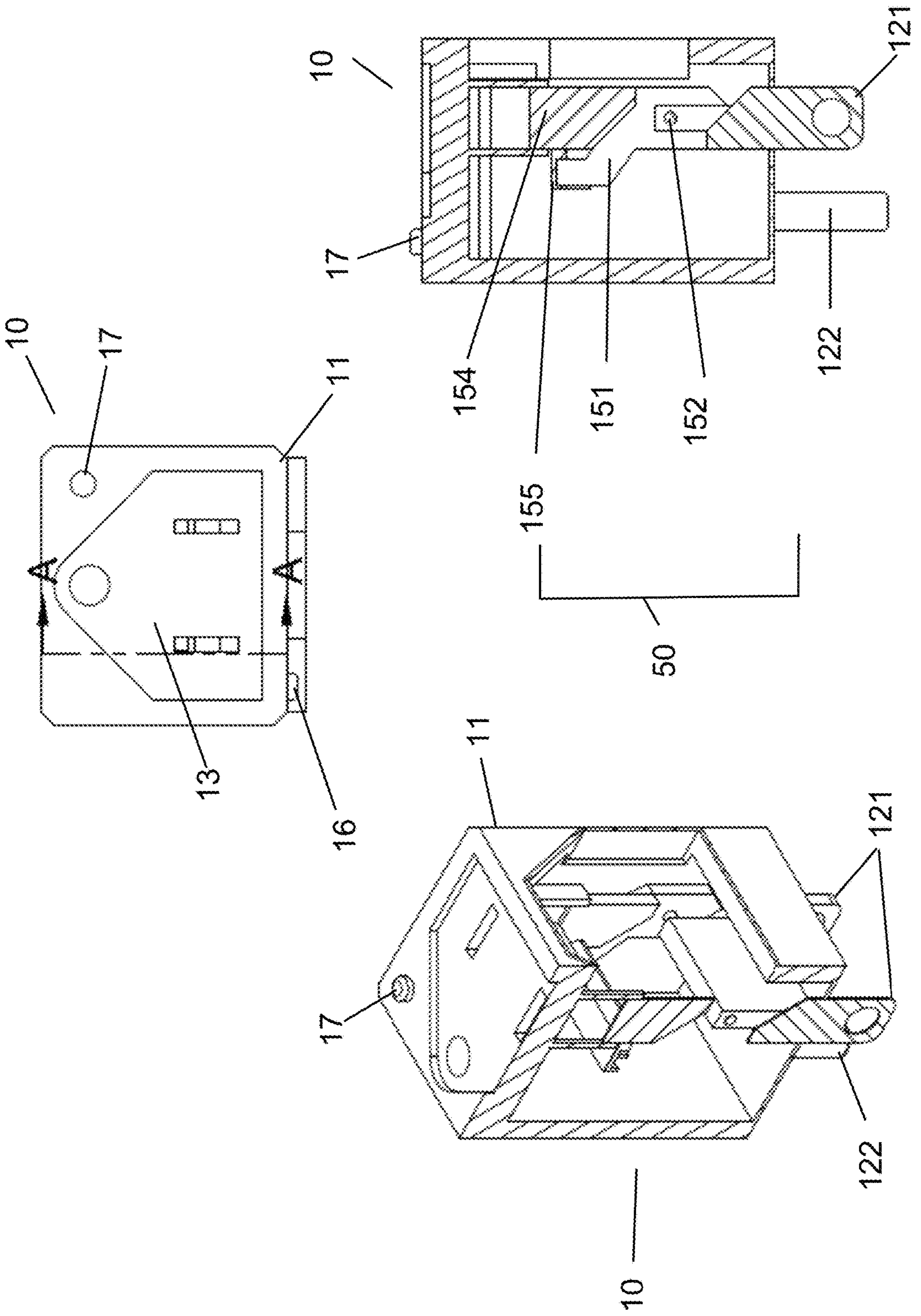
FIG. 7 includes a first end view and side and perspective longitudinal cross section views of the adapter shown in FIG. 5 in which the internal toggle of the adapter is shown in a neutral orientation.

Referring to FIG. 4, a demand cord 40 may be plugged into the adapter receptacle 13 of the adapter 10. The demand cord 40 may include demand cord prongs 42 extending from a demand cord housing 41 and a demand cord wire 43 extending from a demand unit 5, such as, but not limited to, a server, a register, or a morning coffee device. It will be appreciated that any demand units requiring AC power to operate would be suitable as a demand of the AC power transfer module 1. Referring to FIG. 5 and FIG. 6, the demand cord prongs 42 may include demand cord pins 421, corresponding to adapter pins for AC power. The demand cord prongs 42 may include a demand cord ground wire 422, and the demand cord ground wire 422 may be connected with an adapter ground wire 122. The toggle 15 of the adapter 10 includes connector pins 154 configured to correspond to the demand cord pins 421 and to form connection points with the demand cord pins 421.

Referring to FIG. 5, when the adapter 10 is plugged in the receptacle of the original power source 6, electricity is supplied through the adapter pins 121. The toggle 15 includes toggle pins 151 corresponding to the adapter pins 121 and connector pins 152 corresponding to the toggle pins 151. The toggle pins 151 are configured and arranged such that, when the toggle pins 151 are in a first position, the toggle pins 151 make connections with the adapter pins 121 and the connector pins 154 form a circuit thereby supplying electricity from the original power source 6 to the demand unit 5. In some embodiments, when the toggle pins 151 are in the first position, the toggle pins 151 do not rotate about a toggle rotation axis 152.

Referring to FIG. 6, when the diverter 22 is inserted into the adapter 10 through the adapter slot 14, the diverter 22 starts to make contact with a toggle bumper 155. As the diverter 22 advances, the diverter 22 pushes a toggle bumper 155 disposed on an end of the toggle pins 151, thereby causing rotation of the toggle pins 151, from the first position, about the toggle rotation axis 152 (FIG. 7-9) by an angle from about 10 to about 90°. In some implementations, the toggle pins 151 are spring loaded. However, it will be appreciated that any other suitable measures may be employed. As the diverter 22 advances, the connector pins 154 of the toggle 15 make contact with the conductors 221 prior to the toggle pins 151 losing their contacts with the connector pins 154, thereby providing a seamless transition of power from the original power source 6 to the transfer power source 7, a continuous and uninterrupted flow of power. When the contact is complete, the toggle pins 151 are in a second position making no contact with the adapter pins 121 and connector pins 154, and the conductors 221 are in contact with the connector pins 154, and the grabber receptacle ground wire 232 is in contact with the demand cord ground wire 422. Now, the connector pins 154 by making contact with the conductors 221 form a circuit, thereby supplying electricity from the transfer power source 7 to the demand unit 5 through the demand cord 40. Therefore, the source of power is changed from the original power source 6 to the transfer power source 7. The angle, when the toggle pins 151 being in the second position, may range from about 1° to about 90°, or from 5° to 85°, or from 30° to 60°, or about 45°. It will be appreciated that any suitable angle may be employed to achieve the contact allowing electricity from the new source to be supplied to the demand unit 5.

In some embodiments, an AC power transfer module 1 may include an adapter 10 having more than one adapter receptacles 13 disposed on the adapter housing 11, and each receptacle 13 is configured to receive one demand cord 40 extended from a demand unit 5. Each demand cord 40 includes demand cord prongs 42. When the demand cord prongs 42 are inserted into the receptacle 13, each demand cord prongs 42 may be in contact with each toggle 15, whereby toggle pins 151 are in contact with connector pins 154, connected to a demand unit 5, and adapter pins 121, connected to the original power source 6. Therefore, the original power source 6 supplies electricity to each demand unit 5 connected to the adapter 10. The adapter 10 may include an adapter slot 14 configured to receive a grabber 20. The grabber 20 may include a diverter 22 extending from the grabber 20, and the diverter 22 may be configured to be inserted into the adapter slot 14. The adapter receptacles 13 may be sequentially arranged with respect to the diverter 22 orientation when the diverter 22 is inserted into the adapter slot 14. When the grabber 20 connected to the transfer power source 7 is inserted to the adapter slot 14, as the diverter 22 triggers each toggle 15, the connector pins 154 of the toggles 15 make contact with the conductors 221 prior to the toggle pins 151 losing their contacts with the connector pins 154, thereby providing a seamless transition of power to the transfer power source 7 from the original power source 6 for each demand unit 5 connected to the adapter 10. Therefore, a single AC power transfer module 1 can provide a seamless transition of power from the original power source 6 to the transfer power source 7 to multiple demand units 5 connected to the module 1.

Figure 8:
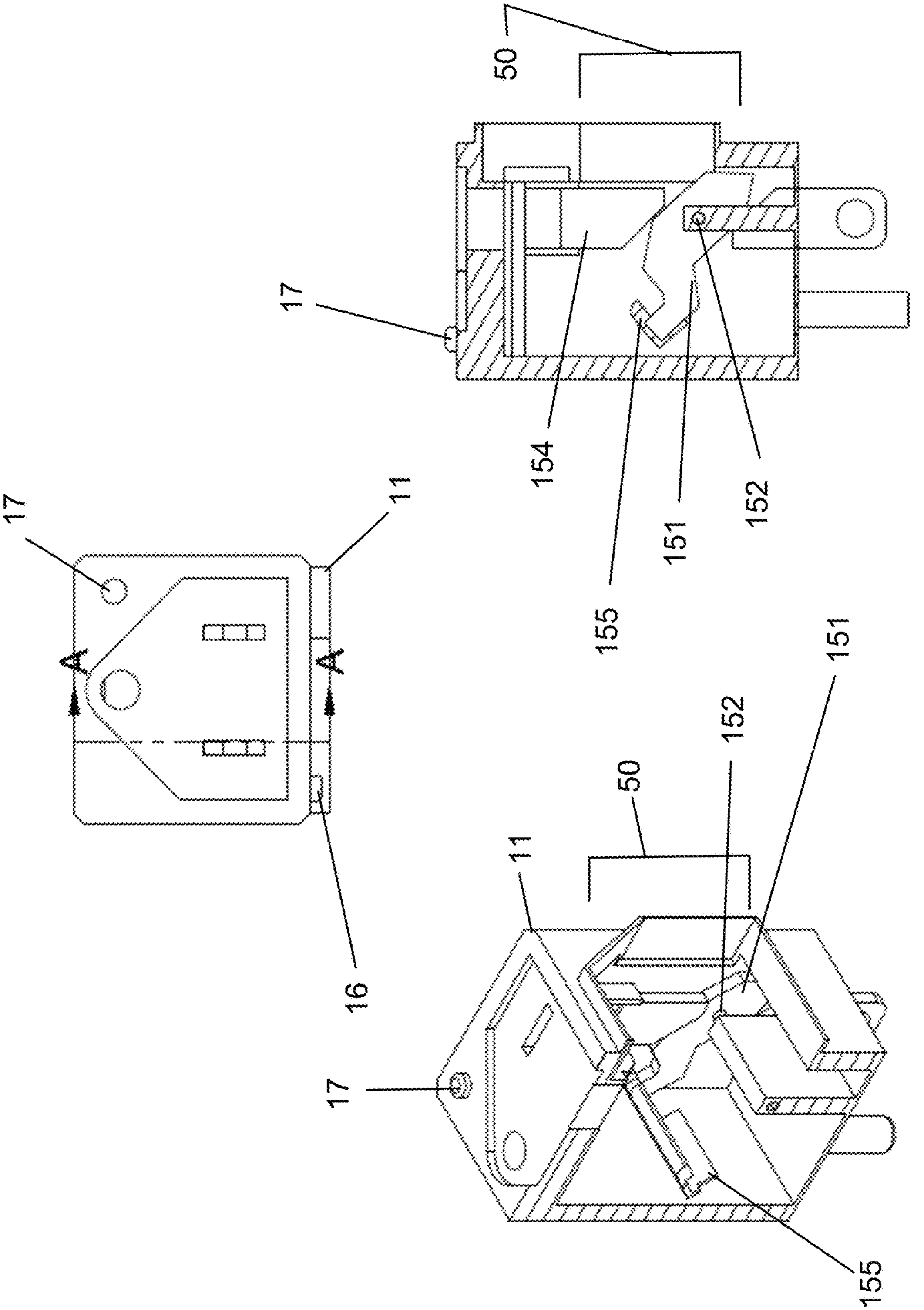
FIG. 8 includes a first end view and side and perspective longitudinal cross section views of the adapter shown in FIG. 5 in which the internal toggle of the adapter is shown in a displaced/rotated orientation.
Figure 9:
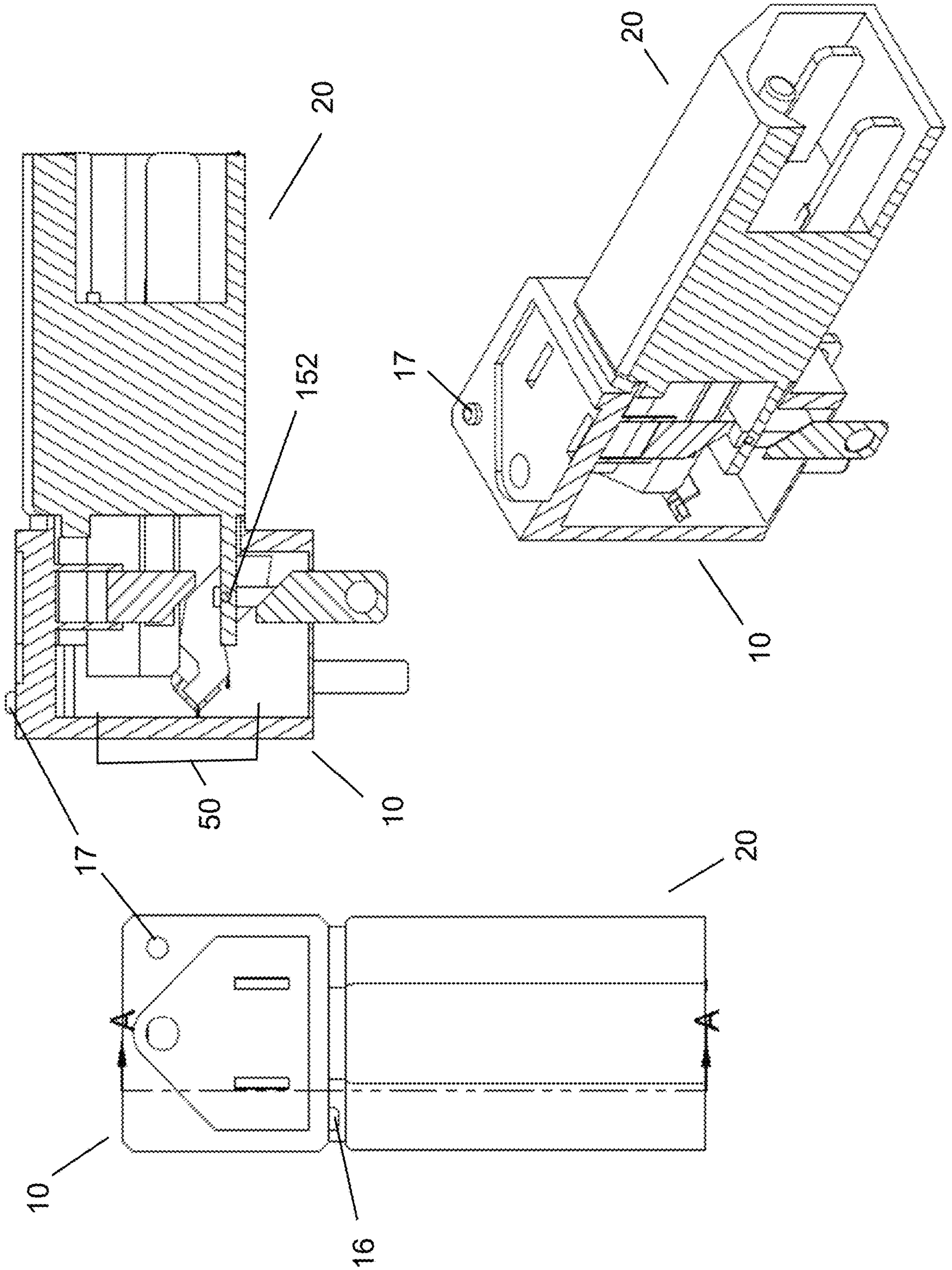
FIG. 9 includes a top view of the adapter and grabber of the AC power transfer module shown in FIG. 6 in an engaged configuration, and corresponding side and perspective longitudinal cross sectional views of the engaged adapter and the grabber in which the internal toggle of the adapter is shown in a displaced/rotated orientation.

Referring to FIG. 1 and FIGS. 7-9, the adapter 10 may include a power light 17 disposed conspicuously on the housing 11 as shown in the drawings. Of course, in some embodiments, there may be no power light, or there may be another form of indicator of power, and in some embodiments there may be either multiple power lights or indicators to indicate power from each of the original and auxiliary power sources, or a single power light that emits different colors based on the power source that is active through the adapter 10. As shown in the drawings, the power light 17 may be disposed on the side where the adapter receptacle 13 is located. In an alternative embodiment, not shown, the power light 17 may be disposed on the side of the adapter 10 where the adapter slot 14 is located. It will be appreciated, however, that any other suitable locations for a power light 17 may be employed. According to the embodiment as shown in the drawings in FIGS. 1, and 7-9, the power light 17 indicates, when turned on, that electricity operating the power light 17 is coming from the original power source 6 through the adapter prongs 12. The power light 17 may be a red LED light. It will be appreciated that any other suitable colors or types of lights may be employed. The electricity for the power light 17 is from the contacts of the demand cord 421 connected in circuit with the original power source 6. When the diverter 22 is inserted in the adapter 10 as shown in FIG. 8 and FIG. 9, the power light 17 may turn off or may emit another color, or in the instance of the presence of an aux power light 16, the aux power light 16 turns on, indicating that electricity operating the aux power light 16 is coming from the transfer power source 7 through the diverter 22. The aux power light 16 may be a green LED light. It will be appreciated that any other suitable colors or types of lights may be employed. The electricity for the aux power light 16 is from the contacts of the demand cord 421, the connector pins 154, and the conductors 221 forming a circuit with a transfer power source 7, in order to ensure that transfer power source 7 (e.g., aux power) is feeding the demand unit 5 before the aux power light 16 turns on.

Figure 10:
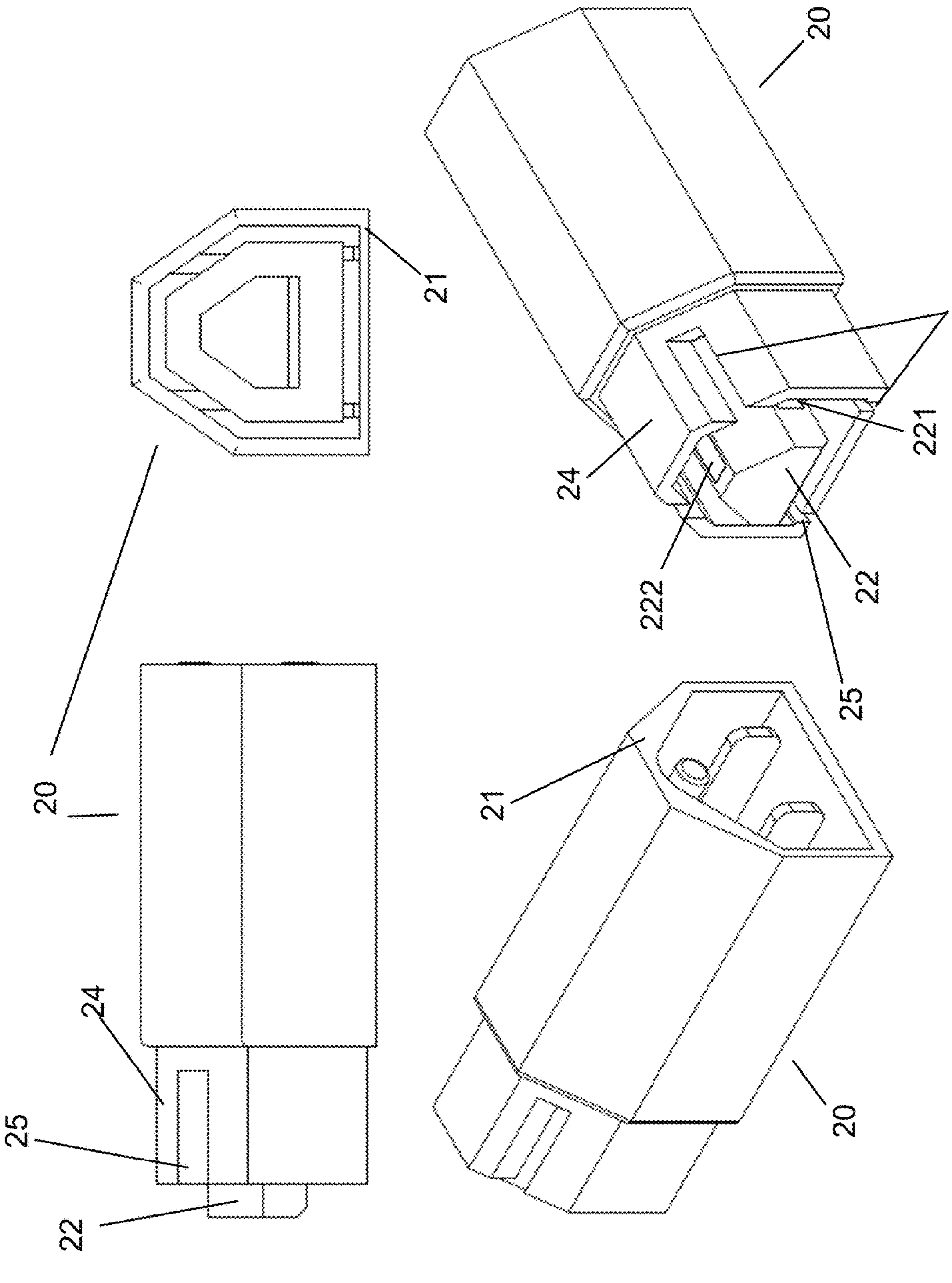
FIG. 10 includes front, end, and side perspective views of an exemplary embodiment of a grabber of the AC power transfer module shown in FIG. 1.
Figure 11:
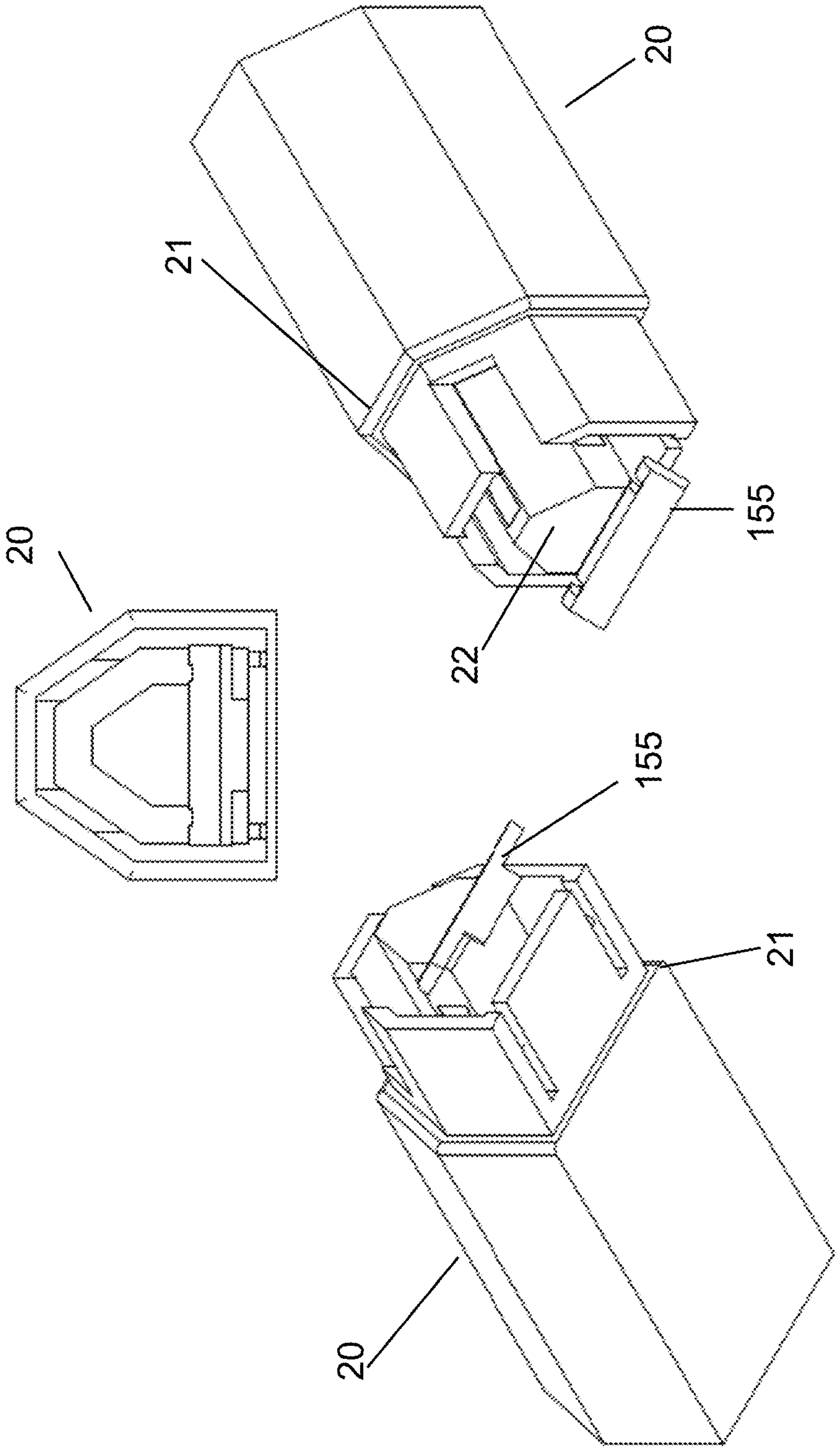
FIG. 11 includes end and side perspective vies of an alternate embodiment of the grabber of the AC power transfer module.

Referring to FIG. 10 and FIG. 11, the grabber 20 may include a grabber safety cover 24. The grabber safety cover 24 is configured to cover the diverter 22 and limit the exposure of the diverter 22. The grabber safety cover 24 may be attached to the grabber housing 21 and detached from the grabber housing 21 before use. In some embodiments, the grabber housing 21 may be configured to receive the grabber safety cover 24 inside the grabber housing 21 when the diverter 22 is inserted to the adapter 10 through the adapter slot 14. It will be appreciated that any other suitable arrangements and mechanisms may be employed. In some embodiments, the grabber safety cover 24 may not be detached from the grabber housing 21 before use and may include grabber relief slots 25. The grabber relief slots 25 may be configured such that as the diverter 22 is inserted in the adapter 10 (FIGS. 5 and 6), the grabber relief slots 25 pass the demand cord pins 421 while keeping the demand cord pins 421 in the grabber relief slots 25. It will be appreciated that any other suitable shape and forms of slots may be employed.

While the invention has been described with reference to a preferred embodiment, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An AC power transfer module comprising at least one adapter and at least one grabber, the AC power transfer module operable to enable uninterrupted delivery of power to a demand unit, the adapter configured to plug into an original power source and supply electricity to the demand unit which is plugged into the adapter, the grabber configured to plug into the adapter and separately engage with a transfer power source, the adapter comprising a mechanical switch that is actuated by engagement of the adapter with the grabber to switch the supply of power from the original power source to the transfer power source without power disruption to the demand unit.

2. The AC power transfer module according to claim 1, wherein the grabber is engaged with the transfer power source via a power cord that is plugged into the transfer power source.

3. The AC power transfer module according to claim 1, wherein the mechanical switch comprises at least one toggle which is mechanically displaced to interrupt the connection between the adapter and the original power source and into electrical communication with the transfer power source.

4. An AC power transfer module configured to enable switching to a transfer power source from an original power source without power disruption, the module comprising:

an adapter including:

an adapter housing;

adapter prongs extending from the adapter housing and including adapter pins configured to receive power from an original power source;

an adapter receptacle disposed on the adapter housing and configured to receive a demand cord extending from a demand unit, the demand cord including a demand cord housing and demand cord prongs extending from the demand cord housing, wherein the demand cord prongs include demand cord pins;

an adapter slot disposed on a side of the adapter housing; and a toggle disposed inside the adapter housing, the toggle including toggle pins having an end, connector pins, and a toggle bumper, the toggle bumper disposed on the end of the toggle pins, wherein the connector pins are configured to make contact with the demand cord pins when the demand cord pins are inserted in the adapter receptacle, and the toggle pins are configured to rotate about a toggle rotation axis by an angle; and a grabber including:

a grabber housing having ends;

a diverter extending from and disposed on one end of the grabber housing, the diverter including conductors disposed thereon; and a grabber receptacle formed and disposed on the opposing end of the grabber housing, the grabber receptacle configured to receive an extension cord receptacle of an extension cord from a transfer power source, the grabber receptacle including grabber receptacle pins configured to be inserted into extension cord receptacle slots disposed within the extension cord receptacle;

wherein the diverter is configured to be inserted through the adapter slot thereby pushing the toggle bumper and moving the toggle pins from a first position to a second position by causing the toggle pins to rotate about the toggle rotation axis by a predetermined angle; and wherein the toggle pins in the first position make contact with the adapter pins and the connector pins thereby providing electricity from the original power source to the demand unit when the adapter pins are inserted in a receptacle of the original power source, and the demand cord prongs are inserted in the adapter receptacle, and wherein the toggle pins in the second position make no contact with the adapter pins and the connector pins, and the conductors make contact with the connector pins thereby providing electricity from the transfer power source to the demand unit when the extension cord receptacle is inserted in the grabber receptacle.

5. The AC transfer module according to claim 4, wherein the predetermined angle ranges from about 5° to about 85°.

6. The AC transfer module according to claim 4, wherein the predetermined angle ranges from about 30° to about 60°.

7. The AC transfer module according to claim 4, wherein the predetermined angle is about 45°.

8. The AC transfer module according to claim 4, wherein the demand cord prongs include a demand cord ground wire, and the adapter prongs include an adapter ground wire configured to connect with the demand cord ground wire.

9. The AC transfer module according to claim 4, wherein the demand cord prongs include a demand cord ground wire, the grabber receptacle includes a grabber receptacle ground wire, and the diverter includes a grounding conductor extending from the grabber receptacle ground wire, the grounding conductor configured to connect with the demand cord ground wire, and the grabber receptacle ground wire configured to be inserted into the extension cord receptacle slots.

10. The AC transfer module according to claim 4, wherein the grabber includes a grabber safety cover, and the grabber safety cover is configured to cover the diverter and limit the exposure of the diverter, and wherein the grabber safety cover includes grabber relief slots, the grabber relief slots configured such that as the diverter is inserted in the adapter, the grabber relief slots pass the demand cord pins while keeping the demand cord pins in the grabber relief slots.

11. The AC transfer module according to claim 4, wherein the adapter includes a power light configured to turn on and off, and the power light when turned on indicates that electricity operating the power light is coming from the original power source, and wherein the power light is a red LED light.

12. The AC transfer module according to claim 4, wherein the adapter includes an aux power light configured to turn on and off, and the aux power light when turned on indicates that electricity operating the aux power light is coming from the transfer power source, and wherein the aux power light is a green LED light.

13. The AC transfer module according to claim 4, wherein the adapter includes:

a plurality of adapter receptacles according to claim 4 disposed on the adapter housing, each adapter receptacle configured to receive one demand cord from a demand unit, wherein each demand cord includes demand cord prongs;

a plurality of toggles according to claim 4 corresponding to the plurality of the adapter receptacles, wherein each demand cord prongs are in contact with the connector pins of the corresponding toggle when the demand cord prongs are inserted in the corresponding adapter receptacle, the toggle pins in the first position are in contact with the connector pins connected to a demand unit and the adapter pins connected to the original power source, and each demand unit forms a circuit with the original power source, and the original power source supplies electricity to each demand unit; and an adapter slot configured to receive the diverter of the grabber, wherein as the diverter advances, the connector pins of the toggles make contact with the conductors prior to the toggle pins losing their contacts with the connector pins, thereby providing a seamless transition of power from the original power source to the transfer power source for each demand unit when the diverter is inserted into the adapter slot making the toggle pins in the second position and the extension cord receptacle connected to the transfer power source is inserted in the grabber receptacle.

14. An AC power transfer module configured to enable switching to a transfer power source from an original power source without power disruption, the module comprising:

an adapter including:

an adapter housing;

adapter prongs extending from the adapter housing and including adapter pins configured to receive power from an original power source and an adapter ground wire;

an adapter receptacle disposed on the adapter housing and configured to receive a demand cord extending from a demand unit, the demand cord including a demand cord housing and demand cord prongs extending from the demand cord housing, wherein the demand cord prongs include demand cord pins and a demand ground wire;

an adapter slot disposed on a side of the adapter housing; and a toggle disposed inside the adapter housing, the toggle including toggle pins having an end, connector pins, and a toggle bumper, the toggle bumper disposed on the end of the toggle pins, wherein the connector pins are configured to make contact with the demand cord pins when the demand cord pins are inserted in the adapter receptacle, and the toggle pins are configured to rotate about a toggle rotation axis by an angle; and a grabber including:

a grabber housing having ends;

a diverter extending from and disposed on one end of the grabber housing, the diverter including conductors disposed thereon and a grounding conductor configured to connect with the demand cord ground wire; and a grabber receptacle formed and disposed on the opposing end of the grabber housing, the grabber receptacle configured to receive an extension cord receptacle of an extension cord from a transfer power source, the grabber receptacle including grabber receptacle pins configured to be inserted into extension cord receptacle slots disposed within the extension cord receptacle and a grabber receptacle ground wire extending from the grounding conductor and configured to be inserted into the extension cord receptacle slots;

wherein the diverter is configured to be inserted through the adapter slot thereby pushing the toggle bumper and moving the toggle pins from a first position to a second position by causing the toggle pins to rotate about the toggle rotation axis by a predetermined angle; and wherein the toggle pins in the first position make contact with the adapter pins and the connector pins thereby providing electricity from the original power source to the demand unit when the adapter pins are inserted in a receptacle of the original power source, and the demand cord prongs are inserted in the adapter receptacle, and wherein the toggle pins in the second position make no contact with the adapter pins and the connector pins, and the conductors make contact with the connector pins thereby providing electricity from the transfer power source to the demand unit when the extension cord receptacle is inserted in the grabber receptacle.

15. The AC transfer module according to claim 14, wherein the predetermined angle ranges from about 5° to about 85°.

16. The AC transfer module according to claim 14, wherein the predetermined angle ranges from about 300 to about 60°.

17. The AC transfer module according to claim 14, wherein the predetermined angle is about 45°.

18. The AC transfer module according to claim 14, wherein the adapter includes an original power light configured to turn on and off, and the original power light when turned on indicates that electricity operating the original power light is coming from the original power source, and wherein the original power light is a red LED light.

19. The AC transfer module according to claim 14, wherein the Adapter includes an aux power light configured to turn on and off, and the aux power light when turned on indicates that electricity operating the aux power light is coming from the transfer power source, and wherein the aux power light is a green LED light.

20. An AC power transfer module configured to enable switching to a transfer power source from an original power source without power disruption, the module comprising:

an adapter including:

an adapter housing;

adapter prongs extending from the adapter housing and including adapter pins configured to receive power from an original power source and an adapter ground wire;

an adapter receptacle disposed on the adapter housing and configured to receive a demand cord extending from a demand unit, the demand cord including a demand cord housing and demand cord prongs extending from the demand cord housing, wherein the demand cord prongs include demand cord pins and a demand ground wire;

an adapter slot disposed on a side of the adapter housing; and a toggle disposed inside the adapter housing, the toggle including toggle pins having an end, connector pins, and a toggle bumper, the toggle bumper disposed on the end of the toggle pins, wherein the connector pins are configured to make contact with the demand cord pins when the demand cord pins are inserted in the adapter receptacle, and the toggle pins are configured to rotate about a toggle rotation axis by an angle; and a grabber including:

a grabber housing having ends;

a diverter extending from and disposed on one end of the grabber housing, the diverter including conductors disposed thereon and a grounding conductor configured to connect with the demand cord ground wire;

a grabber receptacle formed and disposed on the opposing end of the grabber housing, the grabber receptacle configured to receive an extension cord receptacle of an extension cord from a transfer power source, the grabber receptacle including grabber receptacle pins configured to be inserted into extension cord receptacle slots disposed within the extension cord receptacle and a grabber receptacle ground wire extending from the grounding conductor and configured to be inserted into the extension cord receptacle slots; and a grabber safety cover configured to cover the diverter and limit the exposure of the diverter, wherein the grabber safety cover includes grabber relief slots, the grabber relief slots configured such that as the diverter is inserted in the adapter, the grabber relief slots pass the demand cord pins while keeping the demand cord pins in the grabber relief slots;

wherein the diverter is configured to be inserted through the adapter slot thereby pushing the toggle bumper and moving the toggle pins from a first position to a second position by causing the toggle pins to rotate about the toggle rotation axis by a predetermined angle, wherein the predetermined angle is about 45°;

wherein the toggle pins in the first position make contact with the adapter pins and the connector pins thereby providing electricity from the original power source to the demand unit when the adapter pins are inserted in a receptacle of the original power source, and the demand cord prongs are inserted in the adapter receptacle, and wherein the toggle pins in the second position make no contact with the adapter pins and the connector pins, and the conductors make contact with the connector pins thereby providing electricity from the transfer power source to the demand unit when the extension cord receptacle is inserted in the grabber receptacle;

wherein the adapter includes an original power light configured to turn on and off, the original power light when turned on indicates that electricity operating the original power light is coming from the original power source, and the original power light is a red LED light; and wherein the adapter includes an aux power light configured to turn on and off, the aux power light when turned on indicates that electricity operating the aux power light is coming from the transfer power source, and the aux power light is a green LED light.

* * * * *